J. H. NICHOLS.
RELIEF-MAP.
No. 173,988. Patented Feb. 22, 1876.
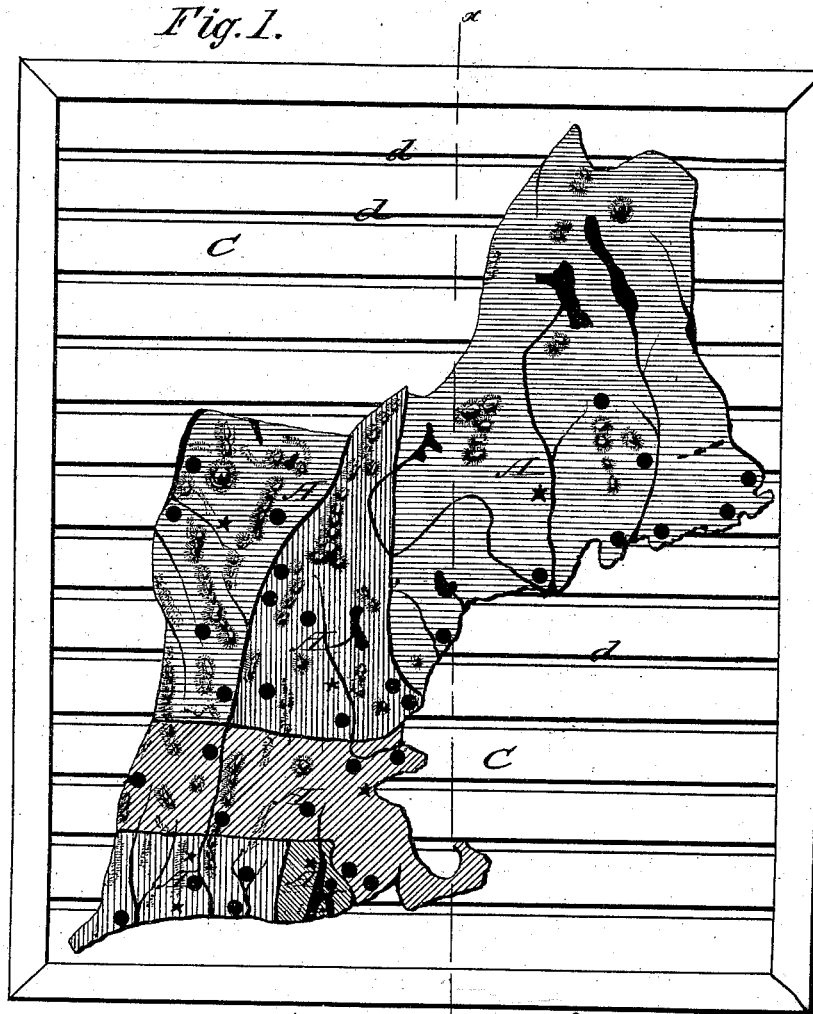
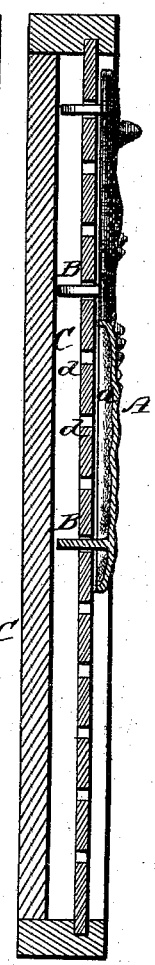
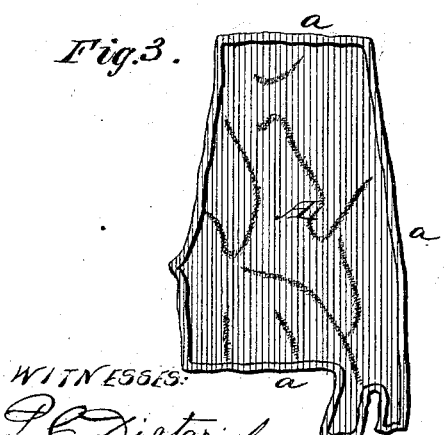
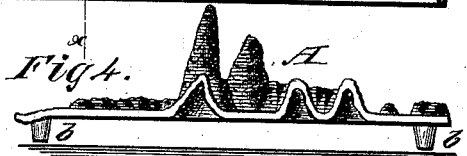
WITNESSES:
P. C. Dieterich
H. C. McArthur
INVENTOR:
J. H. Nichols
per.
T. H. Alexander
ATTORNEY.

2 Sheets—Sheet 2.
J. H. NICHOLS.
RELIEF-MAP.
No. 173,988. Patented Feb. 22, 1876.
Fig. 6. Fig. 7.
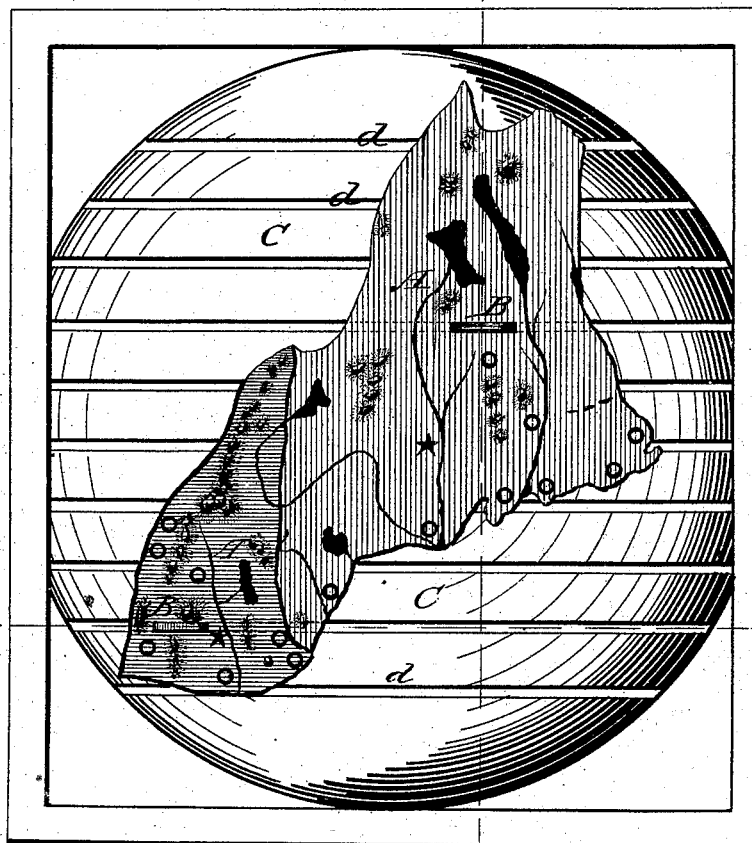
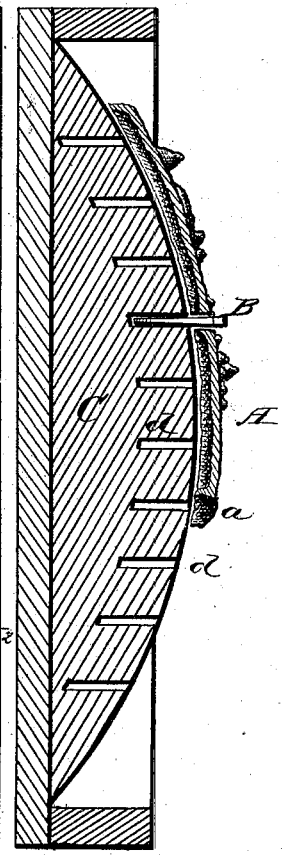
Fig. 8.
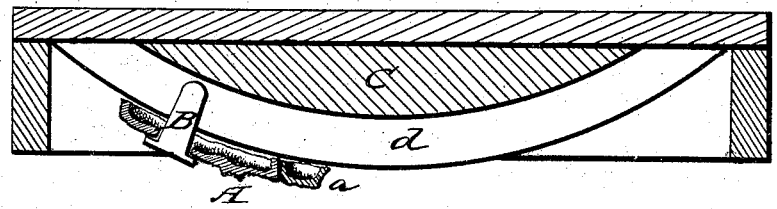
Fig. 9.
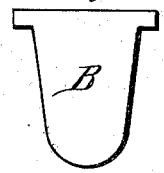
WITNESSES:
P. C. Dieterich.
W. C. McArthur
INVENTOR.
J. H. Nichols
per T. H. Alexander
ATTORNEY.
N. PETERS, PHOTO-LITHOGRAPHER, WASHINGTON, D. C.

UNITED STATES PATENT OFFICE.

JOSEPH H. NICHOLS, OF PHILLIPSBURG, NEW JERSEY, ASSIGNOR TO THE EXCELSIOR SCHOOL-FURNITURE MANUFACTURING COMPANY, OF CINCINNATI, OHIO.

IMPROVEMENT IN RELIEF-MAPS.

Specification forming part of Letters Patent No. 173,988, dated February 22, 1876; application filed December 29, 1875.

*To all whom it may concern:*

Be it known that I, JOSEPH H. NICHOLS, of Phillipsburg, in the county of Warren and State of New Jersey, have invented certain new and useful Improvements in Geographical Models; and I do hereby declare that the following is a full, clear, and exact description thereof, reference being had to the accompanying drawings and to the letters of reference marked thereon, which form part of this specification:

The object of my invention is to facilitate the communication of geographical knowledge, and furnish practical means by which to study and to teach the comparative extent, contour, and outline of any political division of the world by the natural method or object teaching.

To this end the nature of my invention consists in geographical models, forming sections of a relief-map, of any division or divisions of the earth's surface, showing profile, outline, and contour, with the comparative extent, height of table-land, plain, and mountain, and also in the devices upon which such geographical models are to be combined and exhibited, and the means for fastening them thereon, as will be hereinafter more fully set forth.

In order to enable others skilled in the art to which my invention appertains to make and use the same, I will now proceed to describe its construction and operation, referring to the annexed drawings, in which—

Figure 1 is a plan view of my invention, showing the same applied to a flat surface. Fig. 2 is a section of the same through the line $x$ $x$, Fig. 1. Figs. 3, 4, and 5 are detailed views of parts thereof. Fig. 6 shows my invention applied to a convex or spherical surface. Figs. 7, 8, and 9 are detailed views of parts thereof.

A A represent models of any desired sections or political divisions of the earth, formed by causing a thin shell of metal or other suitable material to assume those main topographical features presented by the selected portion. This is done with more or less minuteness, according to the use for which the models are intended and the scale adopted, the required conformation being produced by swedging, casting, molding, carving, or other well-known means. Each model is made distinct of the selected district, and formed free from any adjacent country or adjacent matter. For instance, if a model-map of the United States is desired, each State is made separate and distinct from the others; if simply one State is had, then the different counties are made separate; or, in a county, the different districts. In each case every division or subdivision is a separate and distinct model of the part or section of the earth it represents.

For illustrating the geological formation of the earth, any desired number of shells or layers, partial or entire, may be attached to the under surface of each model to represent the different strata.

To represent the proportionate elevation of any surface above the general level or rotundity of the globe, I may use ledges $a$ $a$, formed on the under side, near the margin of the model, as shown in Figs. 2, 3, and 7, or I may use lugs or pins, $b$ $b$, as shown in Fig. 4, so located and attached as to produce the desired result.

A part of each model is provided with a lug, B, having parallel sides, either secured firmly to it, or loose and fitted to a mortise properly made and placed. The position of these lugs is important, and requires that upon any number of adjacent models they be placed either upon the same line, or parallel lines at suitable equal distances, such lines being preferably run east and west.

In exhibiting these models in a perpendicular position I use a board, C, having a series of parallel grooves, $d$ $d$, in which the lugs B are inserted, to hold the models in their places. These grooves may preferably be arranged so as to correspond with certain parallels of latitude.

The display-board C may be made of wood, paper, metal, or other suitable material, and either with a flat or curved surface. When a curved surface is to be used the models A should, of course, be made of the same curvature.

Where large natural divisions, such as continents, empires, or oceans, are to be represented, I prefer to make them fit to a curved surface or globe.

Instruction by the use of these models is conveyed by inspection, comparison, and by applying one to another, and they may be used either horizontally or otherwise. Such divisions as possess sea-coast may also be placed in an ordinary shallow pan, when, by pouring in water, the bays, seas, capes, peninsulas, &c., are evident, and correct information is easily conveyed in an interesting manner.

Having thus fully described my invention, what I claim as new, and desire to secure by Letters Patent, is—

1. In geographical object-teaching, I claim a relief-map of any portion of the earth's surface, composed of separate and independent models, representing complete divisions or subdivisions of said surface, and constructed with a view to be grouped together on a suitable display-board, as set forth.

2. The geographical models A, constructed as described, and formed with ledges, $a$, or their equivalents, upon the under side thereof, for the purposes herein set forth.

3. The display-board C, formed with a series of parallel grooves, $d$, in combination with the geographical models A, and the lugs or keys B, for the purposes herein set forth.

In testimony that I claim the foregoing as my own I affix my signature in presence of two witnesses.

JOS. HULL NICHOLS.

Witnesses:
  W. C. McArthur,
  C. L. Evert.